C. S. VAN SYCKEL.
VEHICLE SPRING.
APPLICATION FILED JAN. 19, 1914.

1,111,279.

Patented Sept. 22, 1914.

WITNESSES:
R. Schleicher
Jos. G. Denny Jr.

INVENTOR
Claude S. Van Syckel,
BY
Charles N. Butler
ATTORNEY.

UNITED STATES PATENT OFFICE.

CLAUDE S. VAN SYCKEL, OF CAMDEN, NEW JERSEY.

VEHICLE-SPRING.

1,111,279.      Specification of Letters Patent.      Patented Sept. 22, 1914.

Application filed January 19, 1914. Serial No. 812,889.

*To all whom it may concern:*

Be it known that I, CLAUDE S. VAN SYCKEL, a citizen of the United States, residing in the city of Camden, county of Camden, and State of New Jersey, have invented certain Improvements in Vehicle-Springs, of which the following is a specification.

My invention is a vehicle spring designed more particularly for use in automobiles, and its primary object is to provide a simple construction having great resiliency, permitting an extended movement, reducing the transmission of shocks to a minimum, and providing easy riding qualities.

In the preferred construction, a leaf spring supports scroll or C-springs through a hanger connected therewith by three pivotal bearings.

Figure 1:
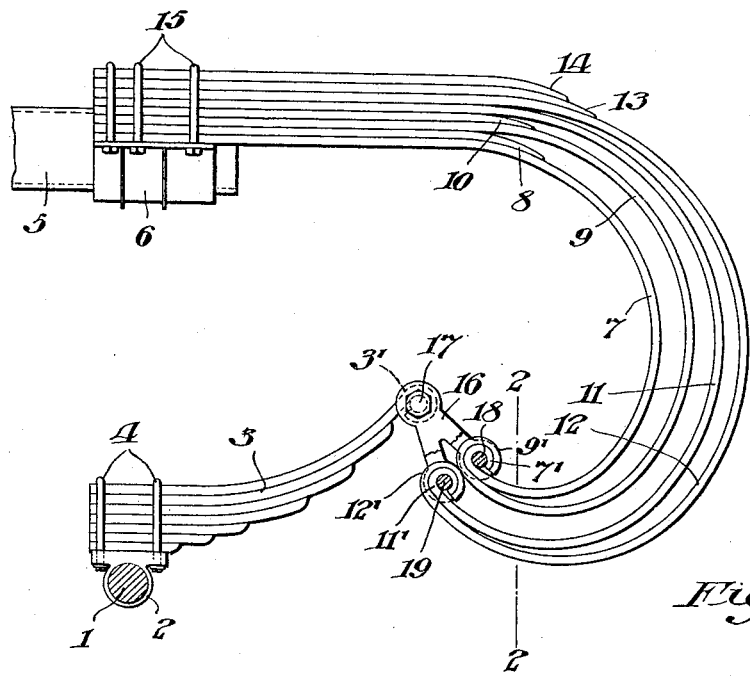
Figure 2:
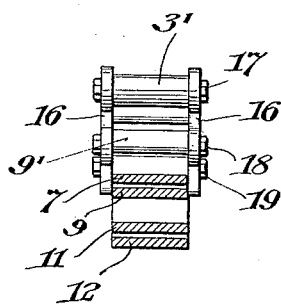

In the accompanying drawings, Figure 1 is a part sectional side elevation of mechanism embodying my improvements, and Fig. 2 is a sectional view taken on the line 2—2 of Fig. 1.

The mechanism shown in the drawings comprises the automobile axle 1 having fixed thereon the bearing 2 for the leaf spring 3 which is fixed in place by the clamp 4; the automobile frame member 5 having fixed thereto the bearing 6 for the spring leaves 7, 8, 9, 10, 11, 12, 13, and 14, which are fixed to the bearing 6 by the clamps 15, and the hangers 16 which are pivotally connected to the eye 3' of the scroll or C-spring 3 by the bolt 17, to the pair of springs 7 and 9 by the bolt 18, and to the pair of scroll or C-springs 11 and 12 by the bolt 19. The short leaves 8, 10, 13, and 14 reinforce the leaves 7, 9, 11, and 12. The nested leaves 7 and 9 have separated sections curved through extended arcs and converging toward ends thereof provided with nested eyes 7' and 9', which are engaged on the bolt or pin 18. The nested leaves 11 and 12 have separated sections curved through extended arcs and converging toward ends thereof provided with nested eyes 11' and 12' which are engaged on the bolt or pin 19.

In operation, shocks communicated to the axle 1 are absorbed or modified so as to eliminate the usual jars to the frame 5, and the frame is provided with an extended movement rendering the body carried thereby unusually easy riding, by the peculiar characteristics of the spring, particularly the characteristics and connections of the spring leaves 7, 9, 11 and 12.

Having described my invention, I claim:

1. A vehicle spring comprising a pivoted hanger, and spring leaves arranged in sets, each set having leaves with separated sections converging to connections with said hanger.

2. A vehicle spring comprising a leaf spring, a hanger pivotally connected therewith, and spring leaves arranged in several sets each comprising leaves having separated sections converging to a movable connection with said hanger.

3. A vehicle spring comprising a pivoted hanger, nested spring leaves arranged in sets respectively comprising separated leaf sections converging to a common connection with said hanger, and short leaves disposed so as to reinforce spring leaves aforesaid.

4. A vehicle spring comprising a leaf spring, a hanger pivoted directly thereto, and scroll springs having separate direct pivotal connections with said hanger said hanger having only three points of connection.

In testimony whereof I have hereunto set my name this 14th day of January, 1914, in the presence of the subscribing witnesses.

CLAUDE S. VAN SYCKEL.

Witnesses:
    Jos. G. DENNY, Jr.,
    C. N. BUTLER.

---

Copies of this patent may be obtained for five cents each, by addressing the "Commissioner of Patents, Washington, D. C."